US009583992B2

(12) United States Patent
De Lepine

(10) Patent No.: US 9,583,992 B2
(45) Date of Patent: Feb. 28, 2017

(54) DEVICE AND METHOD FOR CONTROLLING AN ACTIVE MAGNETIC BEARING

(71) Applicant: GE Energy Power Conversion Technology Ltd, Rugby Warwickshire (GB)

(72) Inventor: Xavier De Lepine, Champigneulles (FR)

(73) Assignee: GE ENERGY POWER CONVERSION TECHNOLOGY LTD., Rugby Warwickshire (GB)

( * ) Notice: Subject to any disclaimer, the term of this patent is extended or adjusted under 35 U.S.C. 154(b) by 644 days.

(21) Appl. No.: 14/028,696

(22) Filed: Sep. 17, 2013

(65) Prior Publication Data

US 2014/0077645 A1 Mar. 20, 2014

(30) Foreign Application Priority Data

Sep. 17, 2012 (FR) ...................... 12 58689

(51) Int. Cl.
*H02P 6/00* (2016.01)
*H02K 7/09* (2006.01)
*F16C 32/04* (2006.01)

(52) U.S. Cl.
CPC ........... *H02K 7/09* (2013.01); *F16C 32/0451* (2013.01); *F16C 32/0487* (2013.01)

(58) Field of Classification Search
USPC .................... 318/721, 163, 400.07, 799, 823
See application file for complete search history.

(56) References Cited

U.S. PATENT DOCUMENTS 4,642,500 A 2/1987 Higuchi
4,686,404 A 8/1987 Nakazeki
(Continued)

FOREIGN PATENT DOCUMENTS

CN 101334068 A 12/2008
EP 1621785 2/2006
(Continued)

OTHER PUBLICATIONS

French Preliminary Search Report from corresponding French Application No. 1258689, Dated May 23, 2013.
(Continued)

*Primary Examiner* — Eduardo Colon Santana
*Assistant Examiner* — Iftekhar Mustafa
(74) *Attorney, Agent, or Firm* — GE Global Patent Operation; Scott R. Stanley

(57) ABSTRACT

A command procedure for an active magnetic bearing, the magnetic bearing comprising a series of electromagnetic actuators forming a stator, each actuator being suitable for exerting radial force on the rotor, a ferromagnetic body forming a rotor, kept free of contact between the electromagnetic actuators and suitable for being set in rotation around an axis of rotation, the rotor being suitable to undergo precession movements in particular. Sensors suitable for detecting radial displacements of the rotor and issuing position signals representative of the radial position of the rotor in relation to the actuators. Calculation of at least one actuator command signal the calculation of the command signal consisting of the application of at least one transfer function to the position signals, the transfer function containing a number of correction coefficients.

8 Claims, 4 Drawing Sheets

(56) References Cited

U.S. PATENT DOCUMENTS

| | | | |
|---|---|---|---|
| 4,885,491 A | 12/1989 | Hiyama et al. | |
| 5,036,265 A | 7/1991 | Weihrich | |
| 5,247,219 A | 9/1993 | Nakagawa et al. | |
| 5,754,425 A | 5/1998 | Murakami | |
| 5,844,339 A | 12/1998 | Schroeder et al. | |
| 2003/0141772 A1* | 7/2003 | Abel | F16C 32/0451 310/90.5 |
| 2008/0243339 A1* | 10/2008 | Nishimori | B60G 7/003 701/41 |
| 2008/0315812 A1 | 12/2008 | Balboul | |

FOREIGN PATENT DOCUMENTS

| | | | |
|---|---|---|---|
| EP | 1771667 | | 4/2007 |
| JP | 09510280 A | | 10/1997 |
| JP | 2001295842 A | | 10/2001 |
| JP | 2007191041 A | * | 8/2007 |
| WO | WO2006010285 | | 2/2006 |

OTHER PUBLICATIONS

European Office Action issued in connection with corresponding EP Application No. 13184035.7 on Dec. 8, 2014.

Unofficial English Translation of Chinese Office Action issued in connection with corresponding CN Application No. 201310423623.5 on Nov. 2, 2016.

\* cited by examiner

DEVICE AND METHOD FOR CONTROLLING AN ACTIVE MAGNETIC BEARING

FIELD OF THE INVENTION

Embodiments of the present invention relate to a command procedure for a magnetic bearing, this magnetic bearing comprising a number of electromagnetic actuators forming a stator, each actuator receiving an input signal for its command and suitable for exerting radial force on the rotor; a ferromagnetic body forming a rotor, kept free of contact between the electromagnetic actuators and suitable for being set in rotation around an axis of rotation, the rotor being suitable in particular for undergoing movements of procession under the action of radial momentum induced by the radial forces exercised and applied perpendicularly to the axis of rotation; sensors for detecting radial displacement and for issuing position signals representative of the radial position of the rotor in relation to the actuators.

The procedure comprising the following stages: calculation, on the basis of position signals, of at least one command signal for the actuators, calculation of the command signal including the application of at least one transfer function to the position signals, the transfer function comprising a number of correction coefficients.

Application of one or each command signal calculated on input of an actuator for control of the radial position of the rotor.

Embodiments of the present invention also relate to a command device for an active magnetic bearing. The magnetic bearing comprising a number of electromagnetic actuators forming a stator, each actuator receiving an input signal for its command and being suitable for exerting radial force on the rotor; a ferromagnetic body forming a rotor, kept free of contact between the electromagnetic actuators and suitable for being set in rotation around an axis of rotation, the rotor being suitable in particular for undergoing movements of procession under the action of radial momentum induced by the radial forces exercised and applied perpendicularly to the axis of rotation; and sensors for detecting radial displacement of the rotor and for issuing position signals representative of the radial position of the rotor in relation to the actuators.

The command device containing means of calculation on the basis of position signals, the means of calculation being suitable for applying at least one transfer function to the position signals, the transfer function containing a number of correction coefficients, the command device being suitable for applying the or each command signal for the actuators on entry to an actuator so as to direct the radial position of the rotor.

For example, an active magnetic bearing allows a moveable body to be kept in a state of lift, typically an electric motor shaft, in a fixed position. It allows the shaft of the engine rotor to turn without friction or contact around an axis of rotation. In the specific domain of very high-speed motors, this type of bearing helps significantly increase the life span of the mobile mechanical parts, and thus limit maintenance operations on these parts.

BACKGROUND OF THE INVENTION

The prior art refers to a command procedure for a magnetic bearing of the type mentioned above. During such a process, an actuator directs the rotation of the rotor around its axis of rotation, this rotation corresponding to a given degree of freedom for the rotor. Excitation of the five other degrees of freedom of the rotor is an undesirable disruption that must be corrected by the means of command. To do this, the means of command, in standard form, comprise one command unit for each degree of freedom of the rotor, the command of each degree of freedom of the rotor thus being separated from the commands for the other degrees of freedom. However, for high rotor-rotation speeds, such command procedures have proved unsuitable. In fact, because of the precession movements caused by the gyroscopic effect of the rotor, coupling occurs between the degrees of freedom. For these rotation speeds, the correction of the movements of the rotor by means of these standard command procedures is therefore relatively unstable. In addition, the performance of the electric motor associated with the rotor is noticeably reduced.

To overcome this problem, document EP 1,771,667 B1 describes a command procedure for a magnetic bearing, within which the methods of precession of the rotor, combined with the precession movements, are taken into account by the means of command. More specifically, different correctors are modelled, each corrector taking account of the modes of precession of the rotor in the form of outside uncertainties. The command procedure therefore involves, for a given speed of rotation of the rotor, selection of the most suitable corrector. In such a procedure, correction of the precession movements of the rotor may prove selectively stable, especially in close proximity to the speeds of rotation for which the correctors have been designed. However, such a command procedure does not guarantee stability of correction throughout the full range of speeds of rotation of the rotor, especially when passing from one corrector to another. In addition, as the rotor precession modes are based on outside uncertainties, these uncertainties also constitute sources of instability for final the correction.

BRIEF SUMMARY OF THE INVENTION

Embodiments of the present invention propose a command procedure for an active magnetic bearing that ensures stability of correction of rotor precession movements regardless of speed of rotation of the rotor.

According to an embodiment of the present invention, there is provided a command procedure of the type mentioned above, within which at least one correction coefficient depends continually on the speed of rotation of the rotor and within which the or each command signal is suitable for commanding continuous offset of the rotor precession movements.

According to an embodiment of the present invention, the command procedure comprises one or more of the following characteristics, taken either in isolation or according to all technically possible combinations:

The said correction coefficient is a function of the moment of inertia of the rotor around the axis of rotation.

The said correction coefficient is a function of the moment of inertia of the rotor around an axis perpendicular to the axis of rotation.

During the calculation of at least one command signal for the actuators, at least the first and second command signals for the actuators are calculated simultaneously, the first command signal being suitable for injection on entry of a first actuator, the said first actuator being suitable for inducing a force on the rotor according to a first axis perpendicular to the axis of rotation, the second command signal being suitable for injection on entry of a second actuator different from the first actuator, the said second actuator being suitable for inducing a force on the rotor according to a second axis perpendicular to the first axis and to the axis of rotation.

The stage of calculation of at least one actuator command signal contains an intermediate calculation stage, based on the position signals, of at least a first and second command signal for inclination of the rotor in relation to the actuators, the first and second command signal for an inclination being suitable for commanding inclination of the rotor around the first and second axis respectively, the first and second actuator command signals respectively being calculated on the basis of the first and second inclination command signals respectively.

The calculation stage of at least one actuator command signal contains an intermediate calculation stage, based on the position signals, of at least a first and second rotor inclination movement signal in relation to the actuators, the first and second inclination movement signal being representative of the inclination of the rotor around the first and second axes respectively, each inclination command signal being calculated on the basis of the first and second inclination movement signals, the first and second inclination movement signals being processed separately for the purposes of calculating the first and second inclination command signals.

According to an embodiment of the present invention, there is provided a command device of the above-mentioned type, in which at least one correction coefficient depends continuously on the speed of rotation of the rotor, so that the command device is suitable for directing, via the or each command signal, the continuous offset of the rotor precession movements.

According to an embodiment of the present invention, the command device contains one or more of the following characteristics, taken either in isolation or according to all technically possible combinations:

The means of calculation are suitable for simultaneously calculating at least a first and second command signal for the actuators, the first command signal being suitable for injection on entry of a first actuator, the said actuator being suitable for inducing a force on the rotor according to a first axis perpendicular to the axis of rotation, the second command signal being suitable for injection on entry of a second actuator different from the first actuator, the second actuator being suitable for inducing a force on the rotor according to a second axis perpendicular to the first axis and the axis of rotation.

The means of calculation contain an inclination command unit, the inclination command unit being suitable for calculating, on the basis of the position signals, at least a first and second command signal for inclination of the rotor in relation to the actuators, the first and second inclination command signals respectively being suitable for commanding the inclination of the rotor around the first axis and the second axis respectively.

The means of calculation contain a signal conversion unit, the signal conversion unit being suitable for calculating a component of the first actuator command signal and a component of the second actuator command signal respectively, on the basis of the first and second inclination command signals respectively.

The means of calculation contain a signal conversion element, the signal conversion element being suitable for calculating at least a first and second signal of rotor inclination movement in relation to the actuators, the first and second inclination movement signals respectively being representative of the inclination of the rotor around the first and second axes respectively, and being suitable for transmission to the inclination command unit.

The inclination command unit is suitable for processing separately the first and second inclination movement signals for calculating the first and second command signals for an inclination.

BRIEF DESCRIPTION OF THE DRAWINGS

The characteristics and advantages of embodiments of the present invention will become apparent from a reading of the following description, which is given purely as a non-limitative example and made with reference to the attached diagrams, in which.

DETAILED DESCRIPTION OF THE INVENTION

Figure 1:
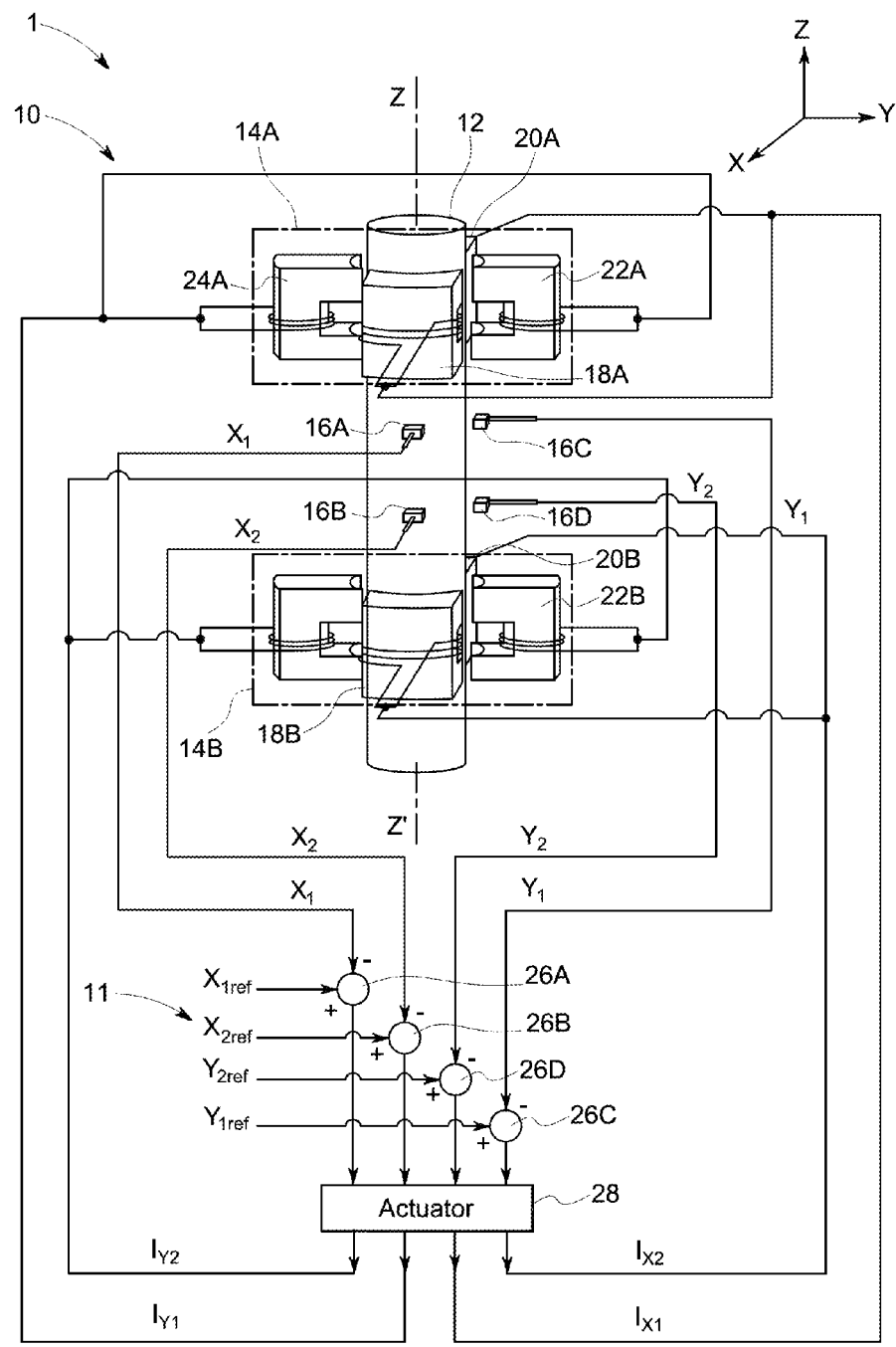
FIG. 1 is a schematic representation of a set consisting of an active magnetic bearing and a bearing command device according to an embodiment of the present invention, the bearing comprising eight electromagnetic actuators and a rotor kept free of contract between the actuators.

FIG. 1 represents a set 1 comprising an active magnetic bearing 10 and means 11 of commanding the bearing 10. In the example of possible use, the active magnetic bearing 10 is radial, suitable for example for supporting a rotating shaft in a revolving electrical machine. The electrical machine presents nominal power in excess of 3 MW, for example 8 MW, together with a speed of rotation in excess of 8,000 revolutions per minutes, for example 14,000 revolutions per minute.

The bearing 10 contains a rotor 12. In the example of realisation, the rotor 12 consists of the rotating shaft of the revolving electrical machine and moves in rotation around an axis Z-Z' at a speed of rotation $\Omega$, the axis Z-Z' being parallel to the greatest dimension of the rotor 12. In the next part of the description, the term "axial direction" is given to the direction defined by the axis Z-Z', and the term "radial direction" is given to any direction defined by an axis perpendicular to the axis Z-Z'. An orthogonal reference, x-y-z, is in addition defined in relation to the axis Z-Z', as illustrated in FIG. 1.

The rotor 12 is for example made of ferromagnetic material and is likened, in the next part of the description, to a rigid solid presenting six degrees of freedom. One of the degrees of freedom of the rotor 12 corresponds to the rotation around the axis Z-Z'. In standard form, this degree of freedom is controlled independently by an electromagnetic actuator, not represented in the figures. The rotor 12 presents a polar moment of inertia Jp and a transverse moment of inertia Jt. The polar moment of inertia Jp is defined as the moment of inertia of the rotor 12 around the axis Z-Z'. The transverse moment of inertia Jt is, meanwhile, defined as the moment of inertia of the rotor 12 around an axis perpendicular to the axis Z-Z' belonging to the plane x-y.

The bearing 10 also comprises a first actuator unit 14A, a second actuator unit 14B, a first sensor 16A, a second sensor 16B, a third sensor 16C and a fourth sensor 16D. The actuator units 14A, 14B are suitable for exerting radial forces on the rotor 12 according to the directions x and y, and thus for keeping the rotor 12 in suspense. The sensors 16A, 16B, 16C, 16D are suitable for measuring the position of the rotor 12 in relation to the actuator units 14A, 14B at specific points according to determined directions. They are also suitable for delivering electronic position signals, these signals being representative of the radial position of the rotor 12 in relation to the actuator units 14A, 14B.

Each actuation unit 14A, 14B comprises at least one electromagnetic actuator. In the example of possible use, the actuation unit 14A, 14B respectively comprises a first electromagnetic actuator 18A and 18B respectively, a second electromagnetic actuator 20A and 20B respectively, a third electromagnetic actuator 22A and 22B respectively, and a fourth electromagnetic actuator 24A and 24B respectively.

As known in itself, each actuator 18A, 18B, 20A, 20B, 22A, 22B, 24A, 24B contains an excitation coil wound around a magnetic circuit with regard to the rotor 12 in order to apply radial forces to the rotor. The magnetic circuit, for example, consists of ferromagnetic material.

Each actuator 18A, 18B, 20A, 20B, 22A, 22B, 24A, 24B receives, at the point of entry to its coil, an input signal, more specifically an input command current. The first and second actuators 18A, 20A, and 18B, 20B respectively, receive a first input signal $I_{X1}$ and a second input signal $I_{X2}$ respectively. The third and fourth actuators 22A, 24A and 22B, 24B respectively receive a third input signal $I_{Y1}$, and a fourth input signal $I_{Y2}$ respectively.

The eight actuators 18A, 18B, 20A, 20B, 22A, 22B, 24A, 24B are fixed in relation to each other, and together form a stator. They are suitable for keeping the rotor 12 in suspense, the rotor 12 being kept free of contact between the eight actuators 18A, 18B, 20A, 20B, 22A, 22B, 24A, 24B.

The first actuator 18A, 18B respectively is suitable for exercising radial force on the high and low regions respectively of the rotor 12, in the direction +x. The second actuator 20A, 20B respectively is suitable for exercising radial force on the high and low regions respectively of the rotor 12, in the direction −x. The third actuator 22A, 22B respectively is suitable for exercising radial force on the high and low regions respectively of the rotor 12, in the direction +y. The fourth actuator 24A, 24B respectively is suitable for exercising radial force on the high and low regions respectively of the rotor 12, in the direction −y.

The radial forces exercised by the actuators 18A, 18B, 20A, 20B, 22A, 22B, 24A, 24B on the rotor 12 induce radial momentum on the rotor 12. This radial momentum is applied in the radial plane radial x-y, perpendicular to the axis of rotation Z-Z', and leads to coupling between the degrees of freedom of the rotor, especially between the degrees of freedom corresponding to rotations around axes x and y. These couplings correspond to precession movements of the rotor 12, especially direct and indirect precession movements, known as such as commonly termed the "gyroscopic effect".

The electronic position signals issued by the sensors 16A, 16B, 16C, 16D are representative of the radial position of the rotor 12 in relation to the actuators 18A, 18B, 20A, 20B, 22A, 22B, 24A, 24B.

The first sensor 16A, the second sensor 16B respectively, is suitable for measuring the position of the upper region and the position of the lower region, respectively, of the rotor 12 along the axis x. It sends an electronic signal $X_1$, $X_2$ respectively, representative of this position. The third sensor 16C, the fourth sensor 16D respectively, is suitable for measuring the position of the upper region and the position of the lower region, respectively, of the rotor 12 along the axis y. The third sensor 16C, the fourth sensor 16D respectively, sends an electronic signal $Y_1$, $Y_2$ respectively, representative of this position.

In the method of implementation being considered, the means of command 11 are connected on one h and to each sensor 16A, 16B, 16C, 16D in order to pick up the position signals $X_1$, $X_2$, $Y_1$, $Y_2$, and on the other hand to each actuator 18A, 18B, 20A, 20B, 22A, 22B, 24A, 24B. The means of command 11 are suitable for calculating a command signal from the actuators and for applying this command signal to the input of each actuator for controlling the radial position of the rotor 12.

The means of command 11 contain a first subtractor 26A, a second subtractor 26B, a third subtractor 26C and a fourth subtractor 26D. The means of command 11 also contain an actuator command device 28, connected between the outlets from the subtractors 26A, 26B, 26C, 26D and the actuator input points.

Each subtractor 26A, 26B, 26C and 26D respectively receives at its non-inverting input point a reference signal $X_{1ref}$, $X_{2ref}$, $Y_{1ref}$, $Y_{2ref}$ respectively and at its inverting input point the signal $X_1$, $X_2$, $Y_1$, $Y_2$ respectively. In standard form, the reference signal $X_{1ref}$, $X_{2ref}$ respectively corresponds to an instruction signal in the upper region and lower region respectively of the 12 along the axis x. In the same way, the reference signal de $Y_{1ref}$, $Y_{2ref}$ respectively corresponds to an instruction signal in the upper region and lower region respectively of the rotor 12 along the axis y. Each subtractor 26A, 26B, 26C, 26D respectively supplies, at its output point, an error signal $S_{X1}$, $S_{X2}$, $S_{Y1}$, $S_{Y2}$ respectively.

The command device 28 receives the four error signals $S_{X1}$, $S_{X2}$, $S_{Y1}$, $S_{Y2}$ at its input point. It is suitable for calculating the input command signals $I_{X1}$, $I_{X2}$, $I_{Y1}$, $I_{Y2}$ and for applying these signals at the input point to the actuators 18A, 18B, 20A, 20B, 22A, 22B, 24A, 24B, as described below.

Figure 2:
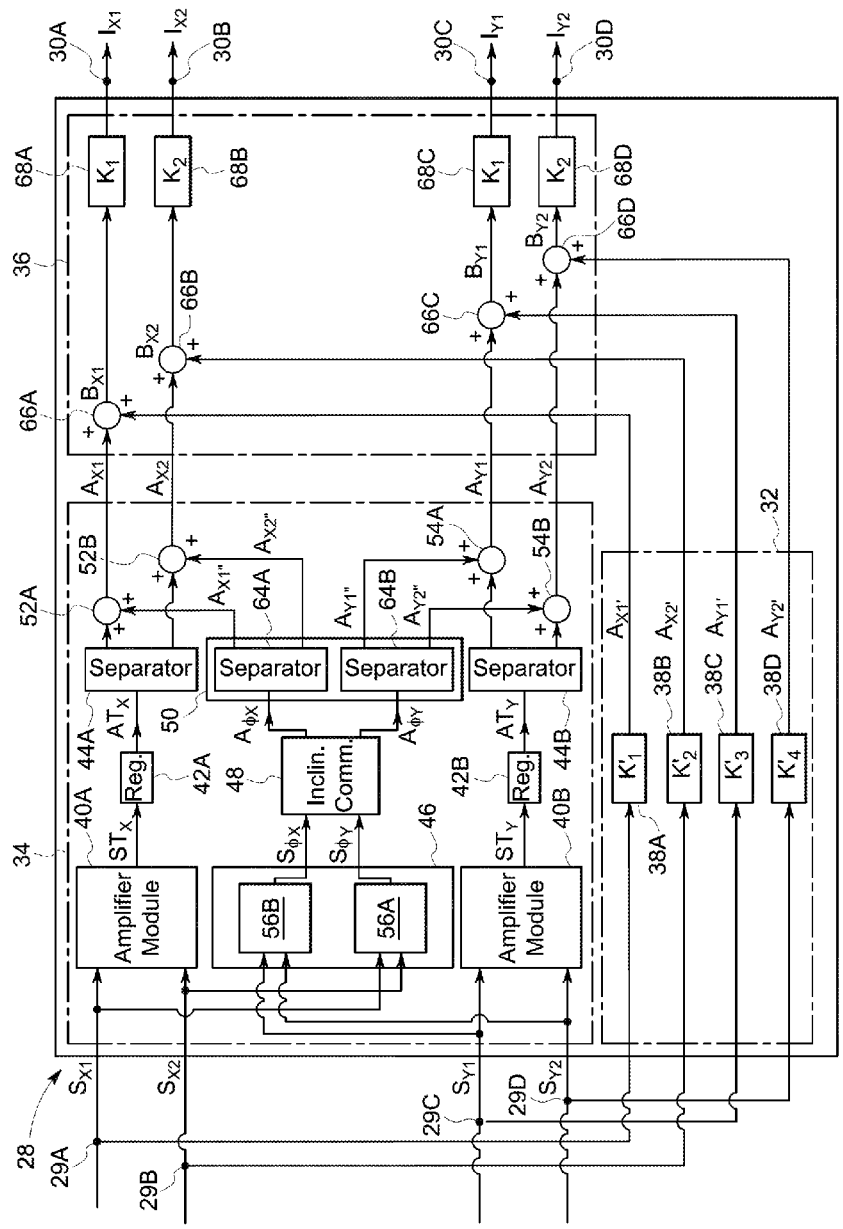
FIG. 2 is a schematic representation of the command device of FIG. 1, comprising a command unit for inclination of the rotor in relation to the actuators.

As illustrated in FIG. 2, the command device 28 contains a first input terminal 29A, a second input terminal 29B, a third input terminal 29C and a fourth input terminal 29D. It also contains a first output terminal 30A, a second output terminal 30B, a third output terminal 30C, and a fourth output terminal 30D. The command device 28 also contains a first intermediate command signal calculation element 32, a second intermediate command signal calculation element 34, and a command signal calculation module 36, connected to the outlet of the calculation elements 32, 34.

As known in the standard form, the first calculation element 32 receives at its input point the error signals $S_{X1}$, $S_{X2}$, $S_{Y1}$, $S_{Y2}$ and is suitable for generating intermediate command signals $A_{X1}'$, $A_{X2}'$, $A_{Y1}'$, $A_{Y2}'$ for the actuators. The intermediate command signals $A_{X1}'$, $A_{X2}'$, $A_{Y1}'$, $A_{Y2}'$ are suitable for commanding offset of the "negative rigidity" effect on the rotor 12, this effect being already known and caused by the currents circulating in the actuator coils. The first calculation element contains a first amplifier 38A, a second amplifier 38B, a third amplifier 38C and a fourth amplifier 38D.

The amplifier 38A, 38B, 38C, 38D respectively is connected to the input terminal 29A, 29B, 29C, 29D respectively and is suitable for supplying at its output point the intermediate command signal $A_{X1}'$, $A_{X2}'$, $A_{Y1}'$, $A_{Y2}'$ respectively.

The first amplifier 38A and third amplifier 38C respectively are suitable for multiplying the signal $S_{X1}$, $S_{Y1}$ respectively by a constant gain $K'_1$. The second amplifier 38B and fourth amplifier 38D respectively are suitable for multiplying the signal $S_{X2}$, $S_{Y2}$ respectively by a constant gain $K'_2$ different from the gain $K'_1$. The values of the gains $K'_1$ and $K'_2$ are chosen according to the standard methods of the prior art.

The second calculation element 34 receives at its input point the error signals $S_{X1}$, $S_{X2}$, $S_{Y1}$, $S_{Y2}$ and is suitable for generating the intermediate command signals $A_{X1}$, $A_{X2}$, $A_{Y1}$, $A_{Y2}$ for the actuators. The intermediate command signals $A_{X1}$, $A_{X2}$, $A_{Y1}$, $A_{Y2}$ are suitable for commanding offset of the radial translational movements and the rotational movements of the rotor 12. The second calculation element contains a first 40A and a second 40B adding amplifier module, a first 42A and second 42B regulator, and a first 44A and second 44B command signal separator. It also contains a signal conversion element 46, am inclination command unit 48 and a signal conversion unit 50, respectively connected in series. The second calculation element 34 also contains a first adding amplifier 52A, a second adding amplifier 52B, a third adding amplifier 54A and a fourth adding amplifier 54B.

The first adding amplifier module 40A and the second adding amplifier 40B respectively are connected on one hand to the two input terminals 29A & 29B and 29C & 29D respectively and on the other hand to the first regulator 42A and second regulator 42B respectively. They receive at one input point the error signal $S_{X1}$, $S_{Y1}$ respectively and at their other input point the signal $S_{X2}$, $S_{Y2}$ respectively, and supply at their output point a signal $ST_X$, $ST_Y$ respectively. The first adding amplifier module 40A and the second adding amplifier module 40B respectively are suitable for applying a distinct weighting coefficient to each signal present at one of their input points, and for adding together the resulting signals to supply the signal $ST_X$, $ST_Y$ respectively.

The output point of the first regulator 42A and of the second regulator 42B respectively is connected to the input point of the first separator 44A and of the second separator 44B respectively. As is already known, each regulator is for example of the PID type (Proportional Integral Derived), this type of regulator being used as the norm in the regulation of looped systems. Each regulator 42A, 42B presents a transfer function $C_1(p)$, expressed for example, with Laplace's transformation, as $$C_1(p) = K_{p1} + \frac{K_{i1}}{p} + \frac{K_{d1} \cdot p}{1 + K'_{d1} \cdot p},$$

where $K_{p1}$, $K_{i1}$, $K_{d1}$ and $K_{d1}'$ are constant gains, as is already known. The first regulator 42A and the second regulator 42B are suitable for supplying at their output point a command signal $AT_X$, $AT_Y$ respectively for translational movement of the rotor 12 along the axis x and the axis y respectively. The first regulator 42A and the second regulator 42B respectively are thus suitable for independently directing the translational movements of the rotor 12 along the axis x and the axis y respectively.

In a variation, each regulator 42A, 42B is of the PI (Proportional Integral) type.

One output point of the first separator 44A and of the second separator 44B is connected to an input point of the first adding amplifier 52A and an input point of the third adding amplifier 54A. The other output point of the first separator 44A and of the second separator 44B is connected to an input point of the second adding amplifier 52B and an input point of the fourth adding amplifier 54B. The first separator 44A and second separator 44B respectively are suitable for applying a first weighting coefficient to the signal $AT_X$ and $AT_Y$ and for supplying the resulting signal at the input point to the first adding amplifier 52A and to the third adding amplifier 54A. It is in addition suitable for applying to the signal $AT_X$ and $AT_Y$ respectively a second weighting coefficient, separate from the first coefficient, and for supplying the resulting signal at the input point to the third adding amplifier 52B and to the fourth adding amplifier 54B.

The signal conversion element 46 receives at its input point the error signals $S_{X1}$, $S_{X2}$, $S_{Y1}$, $S_{Y2}$ and is suitable for generating a first inclination movement signal $S_{\Phi X}$ for the rotor 12 in relation to the actuators and a second inclination movement signal $S_{\Phi Y}$ for the rotor 12 in relation to the actuators. The first signal $S_{\Phi X}$ and the second signal $S_{\Phi Y}$ respectively are representative of the inclination of the rotor 12 around the axis x and around the axis y respectively. The element 46 contains a first subtractor module 56A and a second subtractor module 56B.

The first subtractor module 56A, and the second subtractor module 56B are connected on the one hand to the two input terminals 29A & 29B and 29C & 29D respectively and on the other hand to the input point of the inclination command unit 48. Each subtractor module 56A, 56B presents two input points and one output point. The first subtractor module 56A and the second subtractor module 56B respectively receive at one of their input points the error signal $S_{X1}$, $S_{Y1}$ respectively and at their other input point the error signal $S_{X2}$, $S_{Y2}$ respectively, and supply at their output point the signal $S_{\Phi Y}$, $S_{\Phi X}$ respectively. The first subtractor module 56A and the second subtractor module 56B are suitable for applying the same weighting coefficient to each signal present at one of its input points and for subtracting the resultant signals to supply the signal $S_{\Phi Y}$, $S_{\Phi X}$ respectively.

The inclination command unit 48 receives the signals $S_{\Phi X}$, $S_{\Phi Y}$ at its input point and is suitable for generating a first inclination command signal $A_{\Phi X}$ for the rotor 12 in relation to the actuators and a second inclination command signal for the rotor 12 in relation to the actuators. The first signal $A_{\Phi X}$ and the second signal $A_{\Phi Y}$ respectively are suitable for commanding the inclination of the rotor 12 around axis X and around axis Y respectively. The unit 48 is also suitable for separately processing the signals $S_{\Phi X}$, $S_{\Phi Y}$ in order to calculate the signals $A_{\Phi X}$, $A_{\Phi Y}$.

Figure 3:
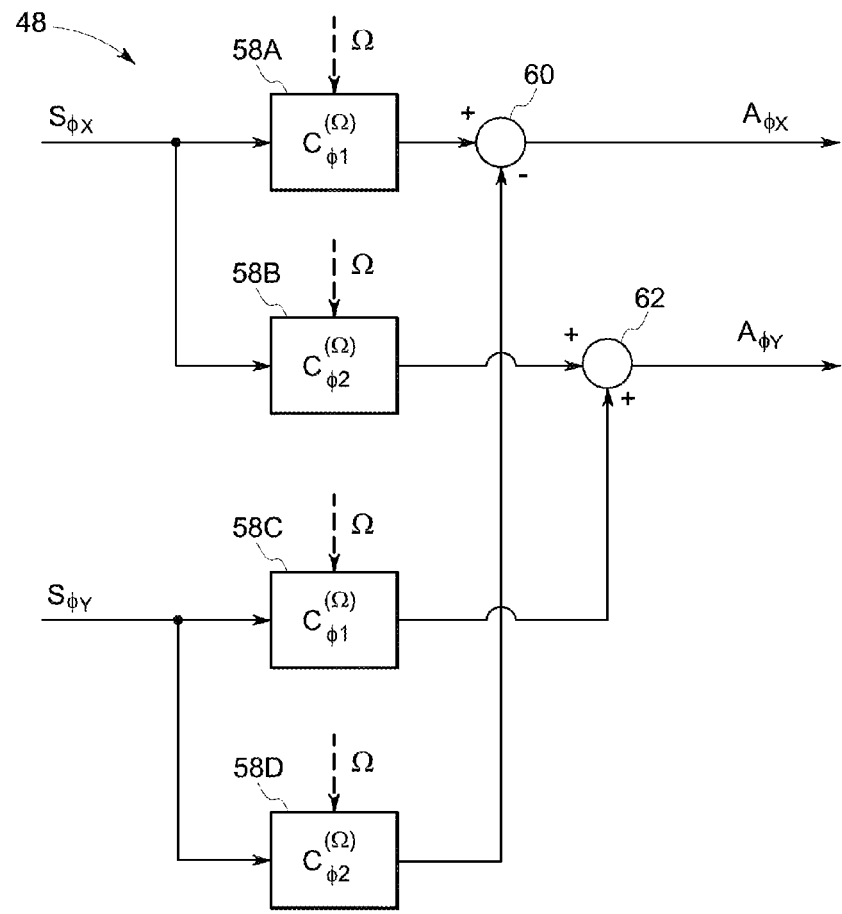
FIG. 3 is a schematic representation of the inclination command unit of FIG. 2.

As illustrated in FIG. 3, the inclination command unit 48 contains a first regulator 58A, a second regulator 58B, a third regulator 58C and a fourth regulator 58D. It also contains a subtractor 60 and an adding amplifier 62.

The first regulator 58A, and the second regulator 58B respectively are connected between the output point of the first subtractor module 56A and the positive input point of the subtractor 60 and one input point of the adding amplifier 62. The third regulator 58C and the fourth regulator 58D are connected between the output point of the second subtractor module 56B and the other input point of the adding amplifier 62 and the inverting input point of the subtractor et 60. Each regulator 58A, 58B, 58C, 58D is also connected to a device for measuring the rotation speed $\Omega$ of the rotor 12, not represented in the figures. In the example of possible use, each regulator 58A, 58B, 58C, 58D is PID and realised using interconnected analogue components.

In a variation, each regulator 58A, 58B, 58C, 58D consists of programmable logic components or of dedicated integrated circuits.

The first and third regulators 58A, 58C present a transfer function $C_{\Phi 1}(p, \Omega)$, expressed for example as follows:

$$C_{\Phi1}(p, \Omega) = K_{p\Phi1} \cdot \left(1 + \frac{1}{K_{i\Phi1} \cdot p} + \frac{K_{d1\Phi1}(\Omega) \cdot p}{1 + K_{d2\Phi1}(\Omega) \cdot p}\right), \quad (1)$$

where $K_{p\Phi1}$ and $K_{i\Phi1}$ are constant gains and $K_{d1\Phi1}(\Omega)$ and $K_{d2\Phi1}(\Omega)$ are expressed for example as follows:

$$K_{d1\Phi1}(\Omega) = K \cdot \sqrt{\frac{4 \cdot J_t^2}{4 \cdot K_{p\Phi1} \cdot J_t - \Omega^2 \cdot J_p^2}} \quad (2)$$

$$K_{d2\Phi1}(\Omega) = K' \cdot \sqrt{\frac{4 \cdot J_t^2}{4 \cdot K_{p\Phi1} \cdot J_t - \Omega^2 \cdot J_p^2}} \quad (3)$$

where K and K' being constant gains.

As indicated by formulae 2 and 3, each coefficient $K_{d1\Phi1}$, $K_{d2\Phi1}$ depends continually on the speed of rotation $\Omega$ of the rotor 12. Each coefficient $K_{d1\Phi1}$, $K_{d2\Phi1}$ is also a function of the polar moment of inertia Jp and of the transverse moment of inertia Jt of the rotor 12.

Similarly, the second and fourth regulators 58B, 58D present a transfer function $C_{\Phi2}(p, \Omega)$, different from the function $C_{\Phi1}(p, \Omega)$, expressed for example as follows:

$$C_{\Phi2}(p, \Omega) = K_{p\Phi2} \cdot \left(1 + \frac{1}{K_{i\Phi2} \cdot p} + \frac{K_{d1\Phi2}(\Omega) \cdot p}{1 + K_{d2\Phi2}(\Omega) \cdot p}\right) \quad (4)$$

where $K_{p\Phi2}$ and $K_{i\Phi2}$ are constant gains and $K_{d1\Phi2}(\Omega)$ and $K_{d2\Phi2}(\Omega)$ are expressed for example as follows:

$$K_{d1\Phi2}(\Omega) = K'' \cdot \sqrt{\frac{4 \cdot J_t^2}{4 \cdot K_{p\Phi2} \cdot J_t - \Omega^2 \cdot J_p^2}} \quad (5)$$

$$K_{d2\Phi2}(\Omega) K''' \cdot \sqrt{\frac{4 \cdot J_t^2}{4 \cdot K_{p\Phi2} \cdot J_t - \Omega^2 \cdot J_p^2}} \quad (6)$$

where K" and K'" being constant gains.

The transfer function expressions $C_{\Phi1}(p, \Omega)$ and $C_{\Phi2}(p, \Omega)$ are obtained via several stages. During the first stage, the fundamental equations of the dynamic for the rotor 12 are written within a "fixed" Cartesian reference. This stage produces a matrix M representative of the inertia of the rotor 12 and a matrix G representative of the precession movements of the rotor 12. The matrices M and G are non-diagonal within this reference. The matrix G depends on the speed of rotation $\Omega$ of the rotor 12.

During a subsequent stage, the first change of reference occurs. More specifically, one passes from the "fixed" Cartesian reference to a "revolving" Cartesian reference to the speed of rotation $\Omega$. This produces a new inertial matrix M' and a new gyroscopic matrix G'. Within this "revolving" reference, the inertial matrix M' is diagonal and the gyroscopic matrix G' is non-diagonal.

During a subsequent stage, a second change of reference occurs. More specifically, one passes from the "revolving" Cartesian reference to a polar reference. There is also a movement from a real space in the mathematical sense, involving real coordinates, to a complex space in the mathematical sense, involving complex coordinates. The global matrix describing the system, which is obtained within this complex space, can then be made diagonal. In addition, this change of reference helps uncouple the cylindrical mode of the rotor 12 from the conical mode of the rotor 12. The conical mode corresponds to the precession modes of the rotor 12.

During a final stage, the real part is identified and, in the complex equations obtained, separated from the imaginary part. This produces a set of new equations. The equations are formulated in a real space and help deduce the transfer functions $C_{\Phi1}(p, \Omega)$, $C_{\Phi2}(p, \Omega)$ of the regulators 58A, 58B, 58C, 58D.

In the example of realisation in FIGS. 1-3, each regulator 58A, 58B, 58C, 58D presents a transfer function $C_{\Phi1}(p, \Omega)$, $C_{\Phi2}(p, \Omega)$ that contains no imaginary part.

In a variation, each regulator 58A, 58B, 58C, 58D presents a transfer function $C_{\Phi1}(p, \Omega)$, $C_{\Phi2}(p, \Omega)$ containing a real part and/or an imaginary part. In a particular sub-variation, the first and third regulators 58A, 58C each present a transfer function containing a real part only and the second and fourth regulators 58B, 58D each presents a transfer function containing an imaginary part only.

The output point of the subtractor 60 is connected to an input point on the signal conversion unit 50. The subtractor 60 supplies, at its output point, the first inclination command signal $A_{\Phi X}$. The output point of the adding amplifier 62 is connected to another input point of the signal conversion unit 50. The adding amplifier 62 supplies, at its output point, the second signal $A_{\Phi Y}$. Each inclination command signal $A_{\Phi X}$, $A_{\Phi Y}$ is thus calculated on the basis of the first $S_{\Phi X}$ and second $S_{\Phi Y}$ inclination movement signal.

The signal conversion unit 50 receives the signals $A_{\Phi X}$, $A_{\Phi Y}$ at its input point and is suitable for calculating the intermediate actuator command signals $A_{X1}"$, $A_{X2}"$, $A_{Y1}"$, $A_{Y2}"$ on the basis of the signals $A_{\Phi X}$, $A_{\Phi Y}$. The intermediate command signals $A_{X1}"$, $A_{X2}"$, $A_{Y1}"$, $A_{Y2}"$ are suitable for commanding offset of the rotation movements of the rotor 12, especially continuous offset of the precession movements of the rotor 12.

As illustrated in FIG. 2, the signal conversion unit 50 contains a first command signal separator 64A and a second command signal separator 64B.

The input point of the first separator 64A is connected to the output point of the subtractor 60. One output point of the first separator 64A is connected to an input point of the first adding amplifier 52A, the other output point of the first separator 64A being connected to one output point of the second adding amplifier 52B.

The input point of the second separator 64B is connected to the output point of the adding amplifier 62. One output point of the second separator 64B is connected to the input point of the third adding amplifier 54A, the other output point of the second separator 64B being connected to one input point on the fourth adding amplifier 54B.

The first separator 64A and second separator 64B respectively are suitable for applying a first weighting coefficient to the signal $A_{\Phi X}$, $A_{\Phi Y}$ respectively and supplying at the input point to the first adding amplifier 52A and fourth adding amplifier 54B the resultant signal $A_{X1}"$, $A_{Y2}"$ respectively. It is also suitable for applying a second weighting coefficient to the signal $A_{\Phi X}$, $A_{\Phi Y}$ respectively, with a value opposed to that of the first coefficient, and for supplying the resultant signal $A_{X2}"$, $A_{Y1}"$ respectively at the input point of the second adding amplifier 52B and third adding amplifier 54A respectively. The output points of the adding amplifiers 52A, 52B, 54A, 54B are connected to the input point of the command signal calculation module 36. The adding amplifiers 52A, 52B, 54A, 54B respectively supply the $A_{X1}$, $A_{X2}$, $A_{Y1}$, $A_{Y2}$ respectively at their output points.

The signal calculation module 36 receives the signals $A_{X1}$, $A_{X2}$, $A_{Y1}$, $A_{Y2}$ at its output point and is suitable for generating the input command signals $I_{X1}$, $I_{X2}$, $I_{Y1}$, $I_{Y2}$ simultaneously.

The module 36 contains a first adding amplifier 66A, a second adding amplifier 66B, a third adding amplifier 66C and a fourth adding amplifier 66D. It also contains a first amplifier 68A, a second amplifier 68B, a third amplifier 68C and a fourth amplifier 68D.

One input point of the adding amplifier 66A, 66B, 66C, 66D respectively is connected to the output point of the adding amplifier 52A, 52B, 54A, 54B respectively. The other input point of the adding amplifier 66A, 66B, 66C, 66D respectively is connected to the output point of the regulator 38A, 38B, 38C, 38D respectively. The adding amplifier 66A, 66B, 66C, 66D respectively is suitable for providing an intermediate input command signal $B_{X1}$, $B_{x2}$, $B_{Y1}$, $B_{Y2}$ respectively at the output point.

The amplifier 68A, 68B, 68C, 68D respectively is connected between the output point of the adding amplifier 66A, 66B, 66C, 66D respectively and the output terminal 30A, 30B, 30C, 30D respectively. The amplifier 68A, 68B, 68C, 68D respectively is suitable for supplying the input command signal $I_{X1}$, $I_{X2}$, $I_{Y1}$, $I_{Y2}$ respectively at the output point.

The first amplifier 68A and third amplifier 68C respectively are suitable for multiplying the signal $B_{X1}$, $B_{Y1}$ respectively through a constant gain $K_1$. The second amplifier 68B and fourth amplifier 68D respectively are suitable for multiplying the signal $B_{X2}$, $B_{Y2}$ respectively by a constant gain $K_2$, different from the gain $K_1$. The $K_1$ and $K_2$ gain values are chosen according to the standard methods of the prior art.

Each input command signal $I_{X1}$, $I_{X2}$, $I_{Y1}$, $I_{Y2}$ is suitable for calculation on the basis of an intermediate signal $B_{X1}$, $B_{X2}$, $B_{Y1}$, $B_{Y2}$, and therefore that of an intermediate signal $A_{X1}"$, $A_{X2}"$, $A_{Y1}"$, $A_{Y2}"$. Therefore, each input command signal $I_{X1}$, $I_{X2}$, $I_{Y1}$, $I_{Y2}$ is specifically suitable for commanding continuous offset of the precession movements of the rotor 12. The command device 28 is suitable for simultaneously calculating the input command signals $I_{X1}$, $I_{X2}$, $I_{Y1}$, $I_{Y2}$. It is also suitable for directing, via each input command signal, the continuous offset of the precession movements of the rotor 12.

Figure 4:
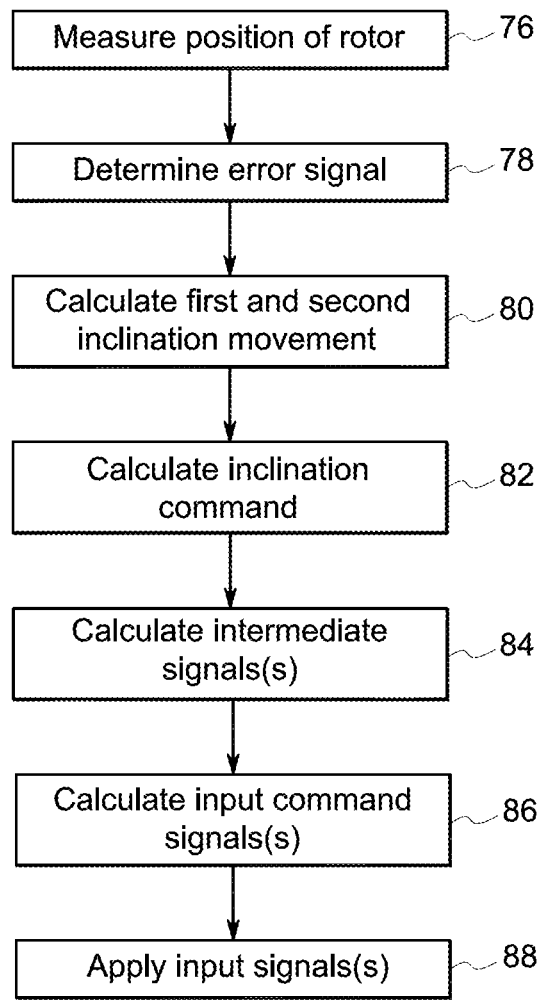
FIG. 4 is a flow chart representing the command procedure according to an embodiment of the present invention.

FIG. 4 represents the stages of a procedure in one method of realising the invention, implemented by the active magnetic bearing 10.

The procedure comprises an initial stage 76, within which the position according to axes x and y of the upper region of the rotor 12 is measured by the sensors 16A, 16B, and the position according to axes x and y of the lower region of the rotor 12 is measured by the sensors 16C, 16D. The sensor 16A, 16B, 16C, 16D respectively supplies the position signal X1, X2, Y1, Y2 respectively at its output point.

During a subsequent stage 78 the subtractor 26A, 26B, 26C, 26D respectively determines the error signal $S_{X1}$, $S_{X2}$, $S_{Y1}$, $S_{Y2}$ respectively on the basis of the position signal X1, X2, Y1, Y2 respectively Y2.

During a subsequent stage 80, the signal conversion element 46 calculates the first inclination movement signal $S_{\Phi X}$ on the basis of error signals $S_{X1}$, $S_{X2}$ and the second inclination movement signal on the basis of error signals $S_{Y1}$, $S_{Y2}$. During this same stage 80 the first adding amplifier module 40A and the second adding amplifier module 40B respectively, calculate the signals $ST_X$, $ST_Y$ respectively.

During a subsequent stage 82 the inclination command unit 48 separately processes the inclination movement signals $S_{\Phi X}$, $S_{\Phi Y}$ and calculates each inclination command signal $A_{\Phi X}$, $A_{\Phi Y}$ on the basis of signals $S_{\Phi X}$, $S_{\Phi Y}$. The inclination command unit 48 therefore calculates each inclination command signal $A_{\Phi X}$, $A_{\Phi Y}$ indirectly on the basis of the position signals X1, X2, Y1, Y2. As indicated by formulae (1), (2), (3), (4), (5) and (6), the unit 48 explicitly, for calculating the command signals $A_{\Phi X}$, $A_{\Phi Y}$, takes account of the rotation speed of the rotor 12. This characteristic, whatever the speed of rotation of the rotor, allows stable correction of the precession movements of the rotor. During this same stage 82 the first regulator 42A and second regulator 42B respectively calculate the signals $AT_X$, $AT_Y$ respectively.

During a subsequent stage 84, the signal conversion unit 50 calculates the intermediate signals $A_{X1}"$, $A_{X2}"$ on the basis of the signal $A_{\Phi X}$. It also calculates the intermediate signals $A_{Y1}"$, $A_{Y2}"$ on the basis of the signal $A_{\Phi Y}$ During a subsequent stage 86, the command signal calculation module 36 simultaneously calculates the input command signals $I_{X1}$, $I_{X2}$, $I_{Y1}$, $I_{Y2}$. The input command signal $I_{X1}$, $I_{X2}$, $I_{Y1}$, $I_{Y2}$ respectively is calculated specifically on the basis of the intermediate signal $A_{X1}"$, $A_{X2}"$, $A_{Y1}"$, $A_{Y2}"$ respectively. The input command signals $I_{X1}$, $I_{X2}$ are therefore calculated on the basis of an inclination command signal $A_{\Phi X}$, and the input command signals $I_{Y1}$, $I_{Y2}$ are calculated on the basis of an inclination command signal $A_{\Phi Y}$.

During a subsequent stage 88, the command device 28 applies at the input point of the actuators 18A, 18B, 20A, 20B, 22A, 22B, 24A, 24B the input command signals $I_{X1}$, $I_{X2}$, $I_{Y1}$, $I_{Y2}$.

By their design, the input command signals $I_{X1}$, $I_{X2}$, $I_{Y1}$, $I_{Y2}$ allow the actuators to be directed to allow continuous offset of the precession movements of the rotor 12. In addition, the signals $I_{X1}$, $I_{X2}$, $I_{Y1}$, $I_{Y2}$ allow stable and uncoupled control of the direct and indirect precession movements of the rotor 12.

It is thus concluded that the command procedure according to the invention ensures stability of correction of the precession movements of the rotor regardless of the rotation speed of the rotor.

The specialist in the field will understand that the invention is not limited to an active magnetic bearing containing eight electromagnetic actuators and four sensors, as illustrated in the present description, but applies more generally to a magnetic bearing containing at least three electromagnetic actuators and two sensors.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for an active magnetic bearing, the magnetic bearing comprising:
   a series of electromagnetic actuators forming a stator, each of the actuators configured to receive an input signal as its command, and to exercise radial force on a rotor;
   a ferromagnetic body forming the rotor, wherein the rotor is kept free of contact between the electromagnetic actuators, configured to rotate around an axis of rotation, and configured to be subjected to precession movements under the action of radial momentum induced by the radial force exercised and applied perpendicular to the axis of rotation; and sensors configured to detect radial displacement of the rotor and to issue position signals representative of the radial position of the rotor in relation to the actuators, the method comprising:

calculating, on the basis of the position signals, at least one actuator command signal, the calculation of the at least one actuator command signal comprises applying at least one transfer function to the position signals, the transfer function comprising a series of correction coefficients, the step of calculating the at least one actuator command signal comprising calculating a first actuator command signal and a second actuator command signal simultaneously, the first actuator command signal is configured to inject at the input point of a first actuator, the first actuator is configured to induce force on the rotor according to a first axis perpendicular to the axis of rotation, the second actuator command signal is configured to inject at the input point of a second actuator, different from the first actuator, the second actuator is configured to induce force on the rotor according to a second axis perpendicular to the first axis and to the axis of rotation, and the step of calculating the at least one actuator command signal further comprising an intermediate calculation stage based on the position signals of at least a first inclination command signal and a second inclination command signal for the inclination of the rotor in relation to the actuators, the first inclination command signal and the second inclination command signal respectively are configured to command inclination of the rotor around the first axis, and the second axis respectively, the first actuator command signal and the second actuator command signal are calculated on the basis of the first inclination command signal and the second inclination command signal respectively; and controlling the radial position of the rotor via application of the at least one calculated actuator command signal to the input point of at least one of the actuators wherein at least one of the correction coefficients depends continuously on the rotation speed of the rotor, and the at least one actuator command signal is configured to command continuous offset of the precession movements of the rotor.

2. The method of claim 1, wherein at least one of the correction coefficients is a function of the moment of inertia of the rotor around the axis of rotation.

3. The method of claim 1, wherein at least one of the correction coefficients is a function of the moment of inertia of the rotor around an axis perpendicular to the axis of rotation.

4. The method of claim 1, wherein calculating the at least one actuator command signal comprises an intermediate calculation stage based on the position signals of at least a first rotor inclination movement signal and a second rotor inclination movement signal in relation to the actuators, the first rotor inclination movement signal and the second rotor inclination movement signal respectively being representative of the inclination of the rotor around the first axis and the second axis respectively, each of the first inclination command signal and the second inclination command signal being calculated on the basis of the first rotor inclination movement signal and the second inclination movement signal, the first rotor inclination movement signal and the second inclination movement signal being processed separately for the calculation of the first inclination command signal and the second inclination command signal.

5. A command device for an active magnetic bearing, the magnetic bearing comprising:

a series of electromagnetic actuators forming a stator, each of the actuators configured to receive an input signal for its command, and to exercise radial force on a rotor;

a ferromagnetic body forming the rotor, wherein the rotor is kept free of contact between the electromagnetic actuators, configured to rotate about an axis of rotation, and configured to undergo a precession movement under the action of radial momentum induced by the radial force exercised and applied perpendicular to the axis of rotation; and sensors configured to detect the radial displacement of the rotor and to issue the position signals representative of the radial position of the rotor in relation to the actuators, the command device comprising:

a calculator configured to calculate, on the basis of the position signals, at least one actuator command signal, wherein the calculator is configured to apply at least one transfer function to the position signals, the transfer function comprising a plurality of correction coefficients, the calculator being further configured to calculate simultaneously at least a first actuator command signal and a second actuator command signal, the first actuator command signal is configured to inject at the input point of a first actuator, the first actuator is configured to induce force on the rotor according to a first axis perpendicular to the axis of rotation, the second actuator command signal is configured to inject at the input point of a second actuator, different from the first actuator, the second actuator command signal is configured to induce force on the rotor according to a second axis perpendicular to the first axis and to the axis of rotation, the calculator comprising an inclination command unit, the inclination command unit configured to calculate, on the basis of the position signals, at least a first rotor inclination command signal and a second rotor inclination command signal in relation to the actuators, the first rotor inclination command signal and the second rotor inclination command signal respectively are configured to command inclination of the rotor around the first axis and the second axis respectively; and wherein the command device is configured to apply the at least one actuator command signal at the input point of at least one of the actuators to direct the radial position of the rotor, wherein at least one of the plurality of correction coefficients depends continually on the rotation speed of the rotor, and the command device is further configured to direct, via the at least one actuator command signal, the continuous offset of the precession movement of the rotor.

6. The command device according to claim 5, wherein the calculator further comprises a signal conversion unit, the signal conversion unit configured to calculate a component of the first actuator command signal and a component of the second actuator command signal respectively, on the basis of the first rotor inclination command signal and the second rotor inclination command signal respectively.

7. The command device according to claim 5, wherein the calculator further comprises a signal conversion element, the signal conversion element is configured to calculate at least a first rotor inclination movement signal and a second rotor inclination movement signal in relation to the actuators, the first rotor inclination movement signal and the second inclination movement signal respectively being representative of the inclination of the rotor about the first axis and the second axis respectively, and to transmit the first rotor inclination movement signal and the second inclination movement signal to the inclination command unit.

8. The command device according to claim 7, wherein the inclination command unit is further configured to process separately the first rotor inclination movement signal and the second inclination movement signal for calculating the first rotor inclination command signal and the second rotor inclination command signal.

* * * * *